United States Patent [19]

Splittstoesser

[11] Patent Number: 4,625,586
[45] Date of Patent: Dec. 2, 1986

[54] RESILIENT ROD COUPLING MEMBER AND ADJUSTING STRUCTURE FOR FRICTION DRIVE MECHANISM

[75] Inventor: Clair D. Splittstoesser, Coffeyville, Kans.

[73] Assignee: Dixon Industries, Inc., Coffeyville, Kans.

[21] Appl. No.: 663,508

[22] Filed: Oct. 22, 1984

[51] Int. Cl.⁴ .................. F16H 15/16; F16H 15/08; F16H 37/06
[52] U.S. Cl. ................................ 74/721; 74/191; 74/194; 403/194
[58] Field of Search .............. 74/721, 191, 190, 193, 74/194; 403/194, 201, 197, 200, 299

[56] References Cited

U.S. PATENT DOCUMENTS

| 1,197,535 | 9/1916 | O'Donnell | 74/721 |
| 1,241,609 | 10/1917 | Davis | 74/721 |
| 1,633,316 | 6/1927 | Davis | 74/721 |
| 1,852,360 | 4/1932 | Mitchell | 74/721 |
| 2,437,111 | 3/1948 | McKeige | 403/201 |
| 2,901,787 | 9/1959 | Whistler, Sr. et al. | 403/297 |
| 3,269,628 | 8/1966 | Tarver | 403/194 |
| 3,306,132 | 6/1964 | Davis | 74/721 |
| 3,410,156 | 10/1966 | Davis | 74/721 |
| 3,448,818 | 4/1967 | Davis | 180/6.66 |
| 3,479,891 | 3/1968 | Moore | 74/191 |
| 3,499,339 | 3/1970 | Moore | 74/191 |
| 3,604,737 | 9/1971 | Tarpex | 403/197 |
| 3,713,677 | 1/1973 | Du Preez | 403/297 |
| 3,844,588 | 10/1974 | Jocsak | 403/197 |

Primary Examiner—Kenneth J. Dorner
Assistant Examiner—Michael D. Bednarek
Attorney, Agent, or Firm—Schmidt, Johnson, Hovey & Williams

[57] ABSTRACT

A connecting member slidably couples an elongated, resilient rod to a movable frame of a variable speed friction drive mechanism. The member is elongated and has an elongated bore non-parallel to the longitudinal axis of the member which slidably receives the resilient rod. The member is selectively rotatable on the frame, and thus the restoring force of the rod adjustably positions the frame at any one of a number of preselected positions wherein the resilient rod is unstressed and in its normal configuration. The member provides means for precise, selective adjustment of the control linkage for the drive mechanism while preventing stress-related failure of the rod.

2 Claims, 9 Drawing Figures

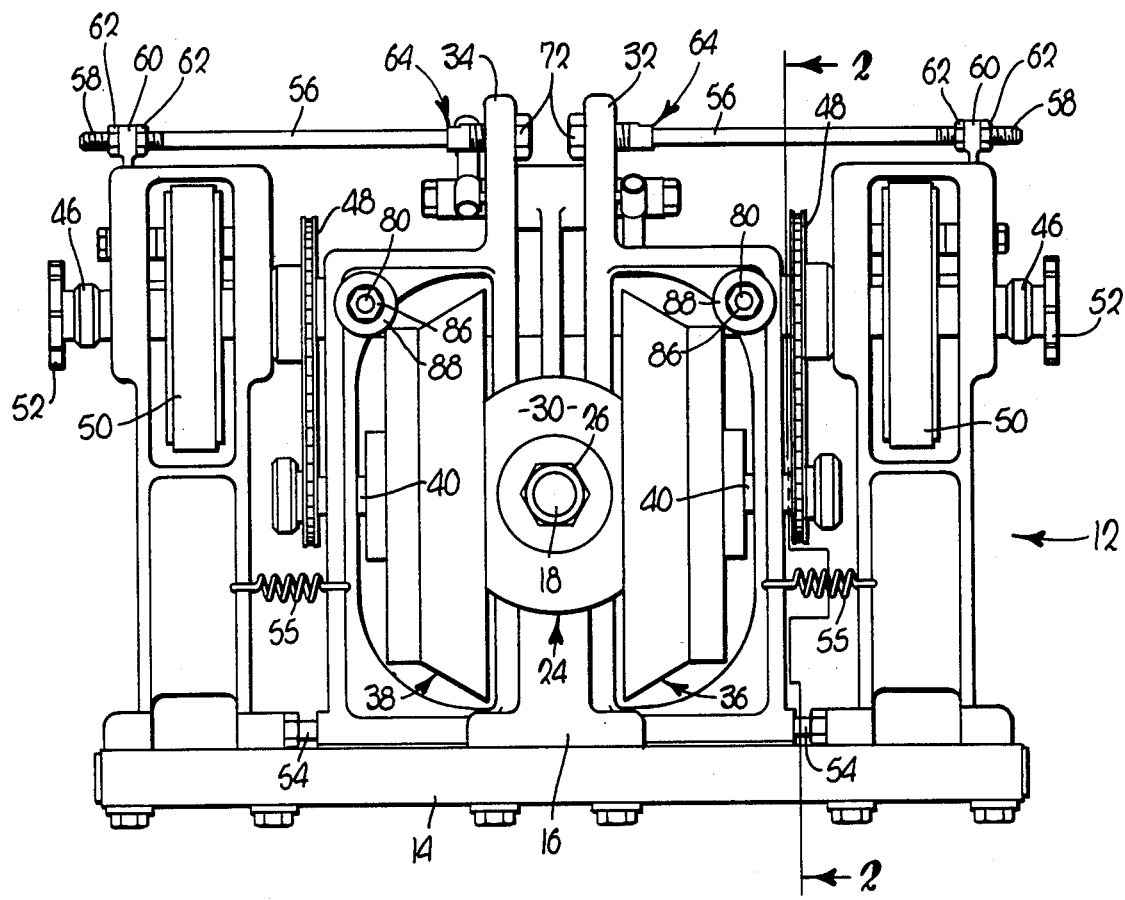
Fig. 1
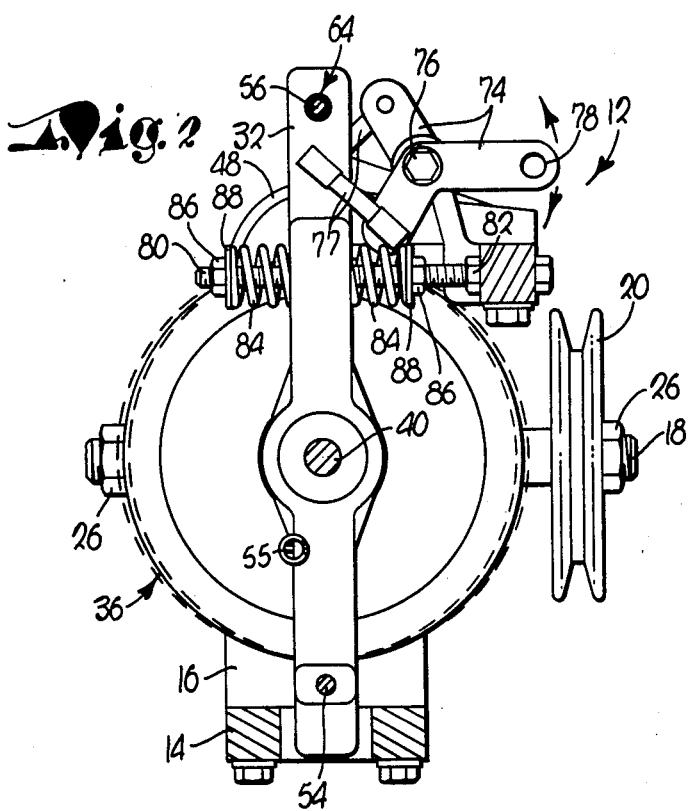
Fig. 2
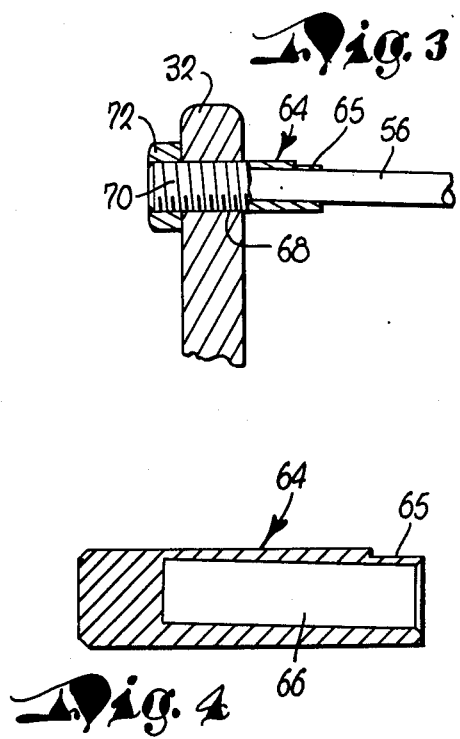
Fig. 3
Fig. 4

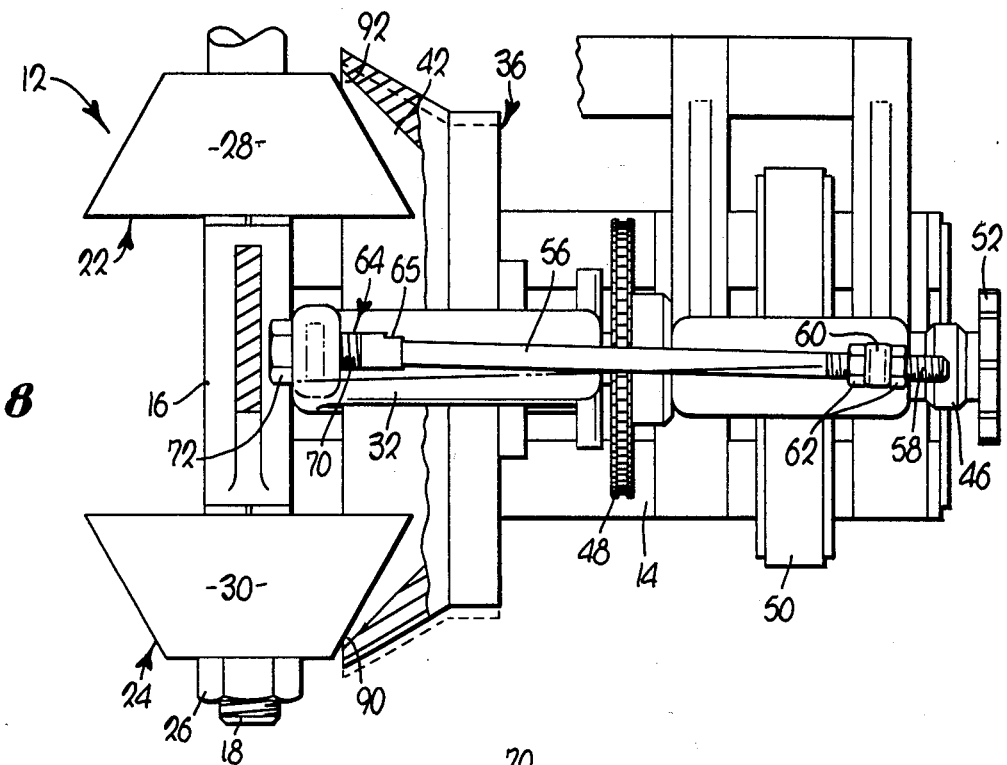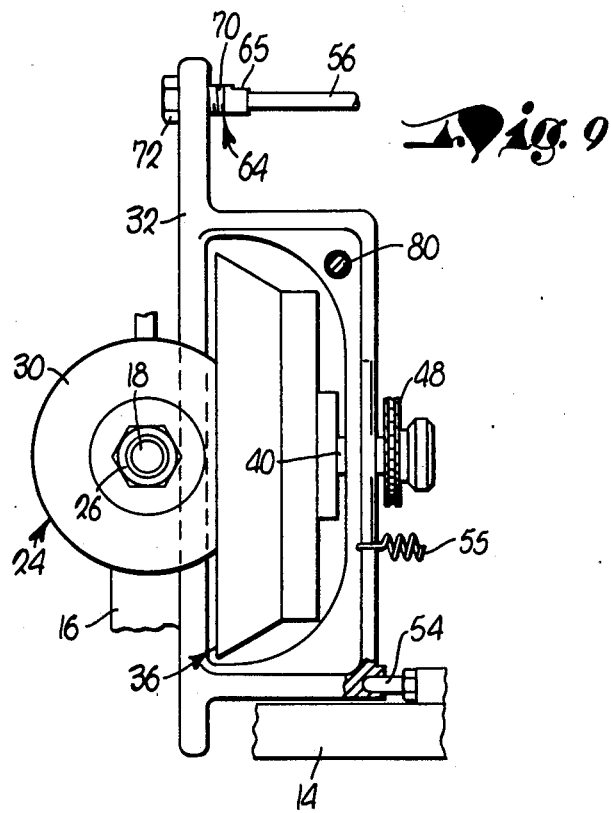

RESILIENT ROD COUPLING MEMBER AND ADJUSTING STRUCTURE FOR FRICTION DRIVE MECHANISM

BACKGROUND OF THE INVENTION

1. Field of the Invention

This invention relates generally to a member for connecting an elongated, resilient rod to a movable frame, as is specifically provided for a variable speed friction drive mechanism in a riding lawnmower.

2. Description of the Prior Art

In recent years, riding lawnmowers having independent transmission and speed controls for each drive wheel have gained widespread consumer acceptance. In these lawnmowers, a transaxle is the clutch, variable speed transmission, differential, and means for braking. Two hand levers each direct power independently to one of the drive wheels, eliminating the need for a steering wheel, clutch pedal or gearshift. As a result, the mower is easy to drive and tightly maneuver around trees or other obstacles and may be turned around within its wheel base.

One drive unit used in these mowers is of the type illustrated in U.S. Pat. No. 3,410,156, issued to Marion Davis, the disclosure of which is hereby incorporated within by reference. This drive unit has a pair of driving cones on a powered input shaft and a pair of driven drums on separate output shafts mounted on subframes. The subframes are rockable in a main frame such that the drums can engage the cone for power transmission to the drive wheels at a speed ratio dependent on the point of contact of the drum on the cone. A resilient rod connected between the subframe and the main frame urges the drum toward a neutral, disengaged position.

In the past, the resilient rod has commonly been provided with a reduced diameter threaded portion which engaged a mating hole in the subframe. Unfortunately, the bending and bowing stresses imparted on the rod often fractured the threaded portion, causing substantial expense and downtime for repair. Additionally, torsional stresses on the rod coupled with the vibration, bumps and jolts associated with the operation of the mower would commonly loosen the threaded rod from the subframe, thereby destroying the vital, close tolerance distance adjustment between the drum and the cones when disengaged.

SUMMARY OF THE INVENTION

The present invention overcomes, to a large degree, the disadvantages of the prior art. The coupling member can successfully connect the resilient rod to the subframe without subsequent breakage or loosening. Additionally, the member has means for accurately adjusting the disengaged distance between the drum and the cones.

More specifically, the coupling member is cylindrical, elongated, and has an elongated rod-receiving bore extending from one end thereof. The rod freely rotates within the member, and torsional stresses occurring in the rod during operation are relieved and not transmitted to the coupling member or the subframe.

Additionally, the longitudinal axis of the bore is nonparallel to the longitudinal axis of the member, and also the member is axially fixable on the subframe. Thus, as the member is turned, the restoring force in the rod moves the subframe slightly to any one of a number of positions. As a result, the distance between the drum and either of the cones is accurately adjustable, while simultaneously the resilient rod returns to its unstressed, normal configuration. However, the control force necessarily exerted by the operator during operation will remain unchanged, and thus each of the control levers will present an identical resistance to the operator regardless of the axial position of the member.

IN THE DRAWINGS

FIG. 1 is a side view of the drive unit and the rod coupling member;

FIG. 2 is a sectional view taken along line 2—2 of FIG. 1;

FIG. 3 is a fragmentary, enlarged, cross-sectional view of the coupling assembly, the resilient rod and the subframe;

FIG. 4 is an enlarged, cross-sectional view of the rod coupling member shown without threads;

FIG. 8 is an enlarged, fragmentary, sectional view similar to FIG. 5; and

FIG. 9 is a fragmentary, sectional view similar to FIG. 1.

DETAILED DESCRIPTION

Figure 5:
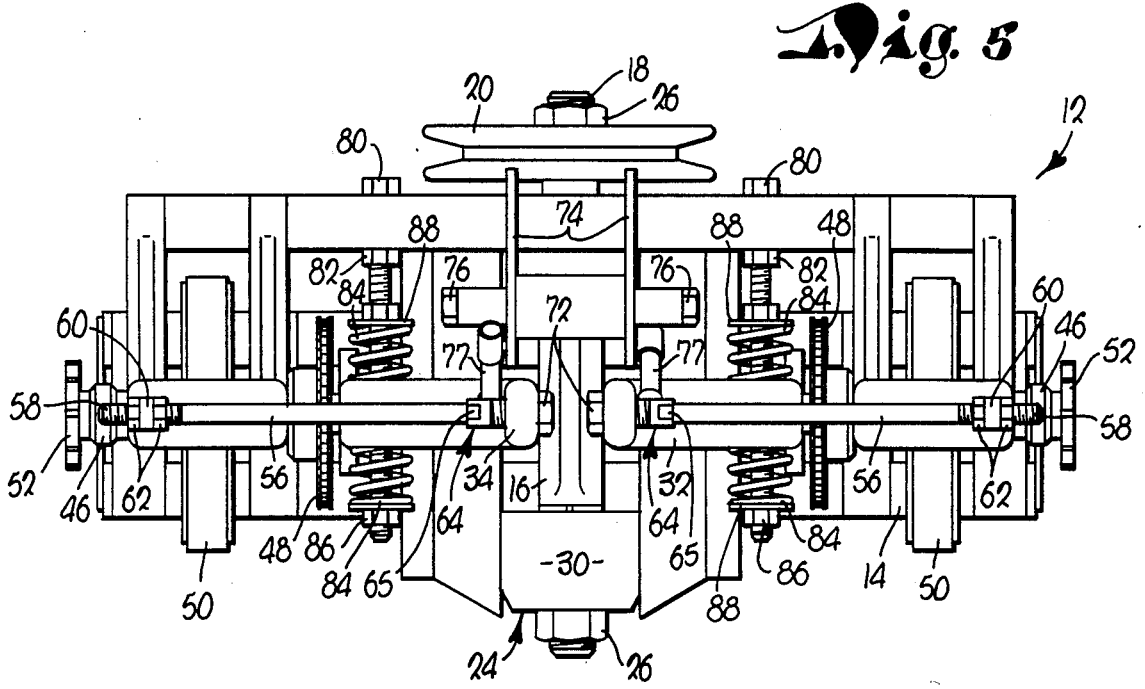
FIG. 5 is an end view of the drive unit and rod coupling assembly.

A variable speed friction drive mechanism is generally designated by the numeral 12, as is best seen in FIGS. 1, 2 and 5. The drive mechanism 12 has a main frame 14 and a central support 16 rigidly affixed thereto.

An elongated input shaft 18 is rotatably connected to the support 16 therethrough and has an attached pulley 20 exterior of the main frame 14. A pair of opposed, outwardly convergent driving cones 22, 24 are mounted on the input shaft 18, and a pair of nuts 26 secure the cones 22, 24 and the pulley 20 against slippage on the input shaft 18. Each of the cones 22, 24 has a frustoconical friction surface 28, 30 respectively, such that an imaginary apex of the surfaces 28, 30 would lie in opposite directions exteriorly of the main frame 14 on a line colinear with the longitudinal axis of the input shaft 18.

A pair of generally P-shaped subframes 32, 34 are oppositely disposed adjacent the support 16 and each rotatably carry a driven drum 36, 38 respectively by means of an elongated shank 40. Each of the drums 36, 38 has a frustoconical inner surface 42, 44 respectively facing a portion of the cone surfaces 28, 30.

Each of the shanks 40 is connected by means of a roller chain 48 to an output shaft 46 rotatably connected to the main frame 14. A cylinder 50 on each of the output shafts 46 may be used in conjunction with a suitable braking device (not shown). Also, a pair of sprockets 52 fixedly engage the output shafts 46 exteriorly of the main frame 14 for use to independently drive a pair of rear wheels on a riding lawnmower (not shown).

A universal joint 54 mounts each of the subframes 32, 34 on the main frame 14. A spring 55 is connected to each of the subframes 32, 34 and a portion of the main frame 14. Additionally, a pair of elongated resilient rods 56 are coupled to the main frame 14 and one of the subframes 32, 34 at a position spaced from the universal joint 54. Each of the rods 56 has a threaded section 58 which extends through a pivot 60 rotatably connected to the main frame 14, and a pair or jamb nuts 62 fasten the rod 56 to the pivot 60.

A cylindrical, elongated resilient rod coupling member 64 has two ends thereon, and an elongated bore 66 extends from one end and has a transverse cross-section mating with the rod 56. The coupling member 64, as illustrated in FIG. 4 before having threads attached thereto, has a longitudinal axis non-parallel to the longitudinal axis of the bore 66. A flat surface 65 is disposed peripherally of the member 64.

As best shown in FIG. 3, each of the subframes 32, 34 has a threaded hole 68, and a threaded portion 70 exteriorly of each of the coupling members 64 extends through one of the holes 68. A lock nut 72 threadably engages the portion 70 such that the coupling member 64 is axially fixable to any one of a number of preselected positions.

A pair of bell cranks 74 are each pivotally mounted on the support 16 by means of a bolt 76. A swingable arm 77 connects one leg of each of the bell cranks 74 to one of the subframes 32, 34. The other leg of each of the bell cranks has an aperture 78 for connection to suitable hand operated control levers (not shown).

Finally, a pair of bolts 80 are each secured to the main frame 14 by a nut 82 and loosely extend through a hole (not shown) in each of the subframes 32, 34. A pair of springs 84 surrounding each of the bolts 80 oppositely engage the subframes 32, 34, each spring adjustable in compression by means of a nut 86 which bears against a washer 88 adjacent one end of the spring 84.

As should now be obvious to one skilled in the art, the subframes 32, 34 can actually be considered as rockable cradles supporting the driven drums 36, 38 which are pivotally moved around the universal joints 54 as the control levers are shifted to tilt the bell cranks 74. Simultaneously, the resilient rod 56 turns about the pivot 60 and also yieldably bends to retain the drum surface 42, 44 in driving engagement with either of the surfaces 28, 30 on the cones 22, 24. Consequently, one of the cones 22, 24 drives the engaging drum 36, 38 at a speed ratio variably dependent upon the distance of the point of contact of the drum surface 42, 44 from the rotational axis of the shank 40, and also the distance of the point of contact on the cone surface 28, 30 from the rotational axis of the input shaft 18.

When the friction drive mechanism 12 is installed in a position, as shown in FIG. 5, the subframes 32, 34 will tend to pivot downwardly by the force of gravity, thereby moving the drum surfaces 42, 44 into engagement with the upper cone 22. To counteract this movement, the springs 84 are adjusted by means of the nuts 86 such that the drums 36, 38 are normally in a neutral position, disengaged from either of the cones 22, 24 when no control force is exerted on the bell cranks 74.

In use, as the subframes 32, 34 are initially moved about the universal joint 54 from the neutral position, the rod 56 turns about the rotational axis of the pivot 60. However, further rocking of the subframes 32, 34 imparts a bow to the resilient rod because the rotational axis of the pivot 60 is not co-linear with a line drawn between the universal joint 54 and the pivot 60. Consequently, a restoring force is actuated in the resilient rod 56, which tends to move the subframe 32, 34 back to its neutral position once the operator has released the control force on the bell cranks 74.

As is now apparent, the resilient rods 56 can freely rotate within the bore 66 of the coupling member 64 during movement of the subframes 32, 34, and thus the jamb nuts 62 will securely engage the pivot 60 without loosening and eventual disengagement thereof. Simultaneously, the distance of the drum surfaces 42, 44 in their neutral position from the cone surfaces 28, 30 will not be involuntarily altered during prolonged periods of operation of the friction drive mechanism 12. Also, the configuration of the coupling member 64 is sized to prevent breakage in the threaded portion 70 while the subframes 32, 34 are rocked. Consequently, the resilient rod 56 may be sufficiently small to impart a proper and convenient restoring force without fear of fracture.

Furthermore, once the lock nut 72 is loosened, the coupling member 64 may be easily rotated about its longitudinal axis by placing a wrench or other suitable tool in engagement with the flat surface 65. Since the longitudinal axis of the bore 66 is non-parallel to the longitudinal, rotational axis of the coupling member 64, the distance in a direction generally parallel to the rotational axis of the cones 22, 24 between the drum surfaces 42, 44 and either of the cone surfaces 28, 30 when disengaged from each other is adjustable to any one of a number of preselected lengths.

Figure 6:
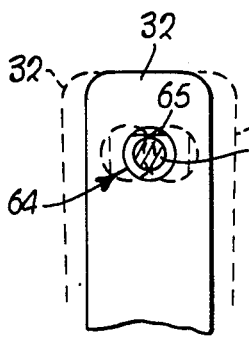
FIG. 6 is an enlarged, fragmentary, sectional view of the subframe and coupling assembly.
Figure 7:
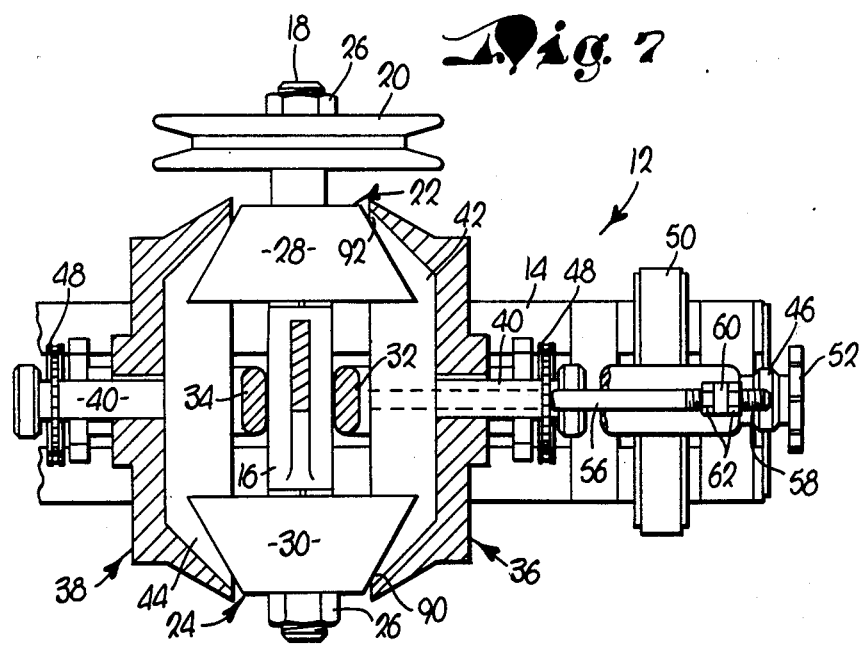
FIG. 7 is a fragmentary, sectional view similar to FIG. 5.

As shown in FIG. 6, the rotation of the coupling member 64 will slightly move the subframes 32, 34 to either of the positions shown by the dotted lines. As seen in FIG. 8, when the coupling member 64 is turned to a position such that the longitudinal axis of the bore 66 is tilted to the position indicated by the disposition of the rod 56, the restoring force in the rod 56 will automatically move the drum 36 upwardly from the position shown by the dotted lines, such that the gap 90 between the lower cone surface 30 and the drum surface 42 is slightly smaller than the gap between the upper cone surface 28 and the drum surface 42. The dashed lines in FIG. 2 illustrate the extent of the positioning adjustment for the drum 36 when the latter is in its neutral state.

The importance of the adjustment of the gaps 90, 92 may be appreciated by reference to the dual, independent nature of the output shafts 46. When the operator moves the control levers simultaneously an identical, certain distance, pivoting the bell cranks 74, each of the drums 36, 38 should engage the cones 22, 24 in identical manner whereby the output shafts 46 are driven at the same speed. Otherwise, the mower would turn slightly in one direction, forcing the operator to manually compensate during all periods of use.

Noteworthy also is the fact that the resilient rod 56 is unstressed and in its normal configuration as the coupling member 64 is adjustably rotated. Therefore, the resistance to bending presented by the rods 56 and translated to the control levers through the bell cranks 74 will be identical in all rotational positions of the member 64. Thus, each of the control levers will present an identical resisting force when moved a similar distance, such that the operator may effortlessly retain the mower in a straight path of travel.

What is claimed is:

1. In a variable speed friction drive mechanism having a main frame, a pair of opposed, outwardly convergent driving cones rotatably connected about a common axis to the main frame, a subframe, a driven drum rotatably supported by the subframe and having an inner frustoconical surface, a universal joint mounting the subframe on the main frame, and an elongated resilient rod coupled to the main frame and the subframe and spaced from said universal joint, such that the drum and subframe are movable to shift said drum surface into and out of a disengaged position relative to both cones into and out of any one of a number of positions engaging either of the cones, whereby one of the cones drives the engaging drum at a speed ratio variably dependent upon the distance of the point of contact on said surface and the driving cone from its respective rotational axis, the improvement of which comprises:

a rod adjusting member connecting the rod to the subframe, the member having means for adjustably moving said drum in a direction generally parallel to the rotational axis of the cones, such that the distance between the drum surface and either of the cones when disengaged from each other is adjustable to any one of a number of preselected lengths, and such that said resilient rod is unstressed in its normal configuration as said distance is adjusted to any one of said preselected lengths, said member being cylindrical, elongated, having two ends, surroundingly engaging a portion of the rod, and having an elongated bore extending from one end thereof and mating with said rod, the longitudinal axis of the bore being non-parallel to the longitudinal axis of the member, whereby as the member is axially rotated relative to the normal longitudinal axis of the rod, the distance between the drum surface and either of the cones when disengaged from each other is adjustable to any one of a number of preselected lengths.

2. The invention of claim 1; additionally comprising:

a threaded hole in the subframe;

a threaded portion exteriorly of the member extending through the hole; and a locknut threadably engaging the exterior portion such that the member is axially fixable to any one of a number of preselected positions.

* * * * *